June 3, 1930.    K. TURK    1,761,898

BALL OR HANDLE FOR GEAR SHIFT LEVERS

Filed April 2, 1928

INVENTOR:
Karl Türk,
Lower Lower
ATTORNEYS.

Patented June 3, 1930

1,761,898

UNITED STATES PATENT OFFICE

KARL TURK, OF BALTIMORE, MARYLAND, ASSIGNOR TO THE PORCELAIN ENAMEL & MANUFACTURING COMPANY OF BALTIMORE, OF BALTIMORE, MARYLAND

BALL OR HANDLE FOR GEAR-SHIFT LEVERS

Application filed April 2, 1928. Serial No. 266,690.

The invention relates to balls or handles for gear shift levers and has for its objects to provide a ball possessing novel and desirable advantages over similar articles heretofore employed, and which in addition to such advantages, is highly ornamental and attractive in appearance and yet may be manufactured to advantage with a minimum of expense.

The invention is particularly useful and desirable as a ball for automobile gear shift handles and is intended to obviate certain disadvantages now obtaining in connection with glass, porcelain or onyx balls commonly used for this purpose in automobiles of the more expensive manufacture.

As is well known, it has been the practice to construct these gear shift balls of various materials, for example of composition, rubber, solid glass, solid porcelain or onyx, as well as from other substances. The most commonly used are composition or imitation onyx. The composition balls are objectionable for the reason that the same are unattractive in appearance and may be easily marred or scored. Furthermore, the composition knobs are more or less porous, thereby absorbing perspiration and grease, rendering it very difficult to keep them clean.

The imitation onyx or solid glass and porcelain knobs have been made of various shapes and colors, and while not having the disadvantages present in the composition handles, are more expensive and are subject to inherent disadvantages. Chiefly among these are that they are easily breakable and it is further necessary to swedge or otherwise insert a brass bushing in the glass or porcelain balls in order to provide means of attachment to the end of the gear shift lever. The provision of such bushings adds to the cost of manufacture, as well as rendering the ball more complicated and tedious to assemble. When the gear shift balls are constructed of cast iron or steel, as has been attempted in certain instances, it is necessary to provide a covering of paint, nickle plating or other material to provide a finished appearance. This latter class of knobs is objectionable for the reason that in cold weather the metallic balls tend to absorb heat and therefore stick to the hand of the operator as in the case of ordinary iron or steel.

It is the purpose of the present invention to provide an improved ball or handle for gear shift levers which will not possess any of the disadvantages above described in connection with other forms of balls or knobs, and yet will be economical to manufacture, pleasing and ornamental in appearance and possess other inherent advantages to be described which are not present in any of the balls or handles now in use.

It is the purpose of the present invention to construct the ball or handle from a single piece of cast iron or metal having an integral threaded aperture for convenient attachment to the end of the gear shift lever, said cast iron ball being thereafter covered with a genuine porcelain or vitreous enamel which may be finished in various colors and designs to present an ornamental and attractive appearance. The gear shift ball constructed in accordance with the invention has an exteriorly smooth finish, resembles very closely the solid imitation onyx ball, but is unbreakable and may be much more cheaply manufactured. It is not necessary to provide bushings to permit the ball to be attached to the gear shift lever and the ball may be conveniently secured in place on various sizes of levers which may be accommodated by varying the size of the integral screw threaded hole or aperture in the device.

The knob constructed in accordance with the present invention may be easily cleaned with a dry cloth and is impervious to perspiration, oil or dirt. Furthermore the knob may not be scarred or otherwise marred as is the case with composition devices used for the described purpose.

The smooth and even finish of porcelain enamel may be provided in all colors or color combinations, and lettering, advertising or the initials or monogram of the automobile owner may be embodied in the finish as an integral part of the article without affecting the smoothing or evenness of the latter. Any such lettering or visible indicia is directly fired in the glaze of the porcelain finish and thereby remains indefinitely and cannot be removed or blemished.

The knob or ball constructed in accordance with the present improvements is obviously possessed with greater strength and durability than knobs heretofore used and above described, and combined with this advantage the cost of producing the ball of the present character is considerably less than that obtaining in corresponding articles now found on the market.

The increased weight due to its construction of cast iron or metal is of advantage in imparting solidity to the gear shift handle and tends to maintain the latter against accidental displacement from its adjusted position.

Numerous other objects and advantages of the invention will be apparent as it is better understood from the following description, which, taken in connection with the accompanying drawings, discloses a preferred embodiment thereof.

Figure 1:
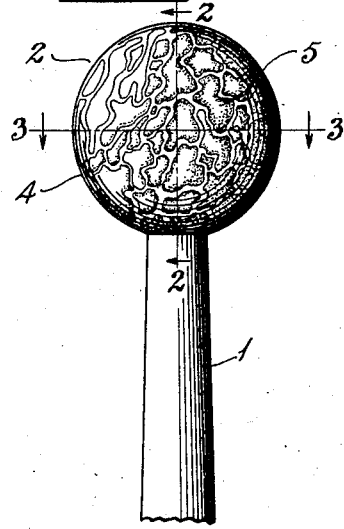
Fig. 1 is a side view of a gear shift ball which is secured to the end of the gear shift lever, and constituting a preferred embodiment of the invention.
Figure 2:
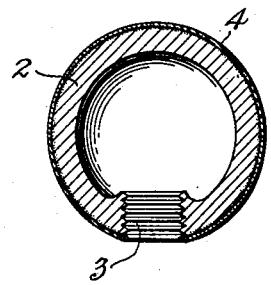
Fig. 2 is a central vertical section on line 2—2 of Fig. 1, the gear shift lever being omitted.
Figure 3:
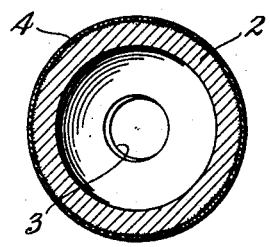
Fig. 3 is a view similar to Fig. 2, but consisting of a transverse section on line 3—3 of Fig. 1.

Referring to the drawings, 1 indicates an automobile or other gear shift lever and 2 represents a ball which as illustrated is preferably formed integrally of cast iron having a lower opening or aperture 3 which is screw threaded as shown for convenient attachment of the ball to the end of the gear shift lever. A coating or covering of porcelain enamel is indicated at 4 and is burned or fused into the ball, after the same is cast, at an exceedingly high temperature to constitute a permanent smooth and even finish.

Figure 4:
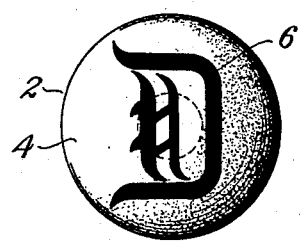
Fig. 4 is a plan view showing an example of lettering burned into and constituting an integral part of the porcelain enamel finish or coating.

As shown in Fig. 1 the porcelain finish 4 may be of any desired ornamental character to represent wood or marble graining, or imitation onyx. The porcelain finish may be of any desired color or combinations thereof and provides a very attractive and ornamental handle possessing every desirable quality and advantage in a gear shift ball or handle. If desired, lettering may be embodied in the porcelain enamel finish and baked into the same to constitute an integral and permanent part of the ball. Such lettering is indicated at 6 in Fig. 4 and may constitute the name, initial or monogram of the car owner or manufacturer. The finished ball is possessed of a permanent glaze, and is smooth and even through its entire surface. In constructing the article of cast iron the same is possessed of more than the ordinary weight thereby tending to maintain the gear shift lever in any adjusted position and minimizing vibrations ordinarily present when the ball is formed of material of lighter weight.

It will be apparent that the improved gear shift ball described is impervious to moisture or perspiration and may be easily cleaned and may be manufactured at a minimum cost. The finished article has the appearance of an expensive article of manufacture and by reason of its vari-colored or grained finish results in an attractive article which appeals to the car owner and manufacturer and thereby finds a ready sale on the market.

While the variegated porcelain enamel coating fired into the surface gives the appearance of glass or onyx, the construction of the ball of cast metal renders the same practically indestructible and more durable and permanent than any article of this character heretofore employed.

It is thought that the invention and many of its attendant advantages will be understood from the foregoing descriptions, and it will be apparent that various changes may be made in the form, construction and arrangement of the parts without departing from the spirit and scope of the invention or sacrificing any of its material advantages, the form hereinbefore described being merely a preferred embodiment thereof.

What I claim is:

A lever-weighting ball handle for automobile gear shift levers, consisting of cast iron having an aperture provided with a screw thread formed in the metal of the ball for attachment of the ball to the end of the lever, and having a coating of vitreous enamel fused to the surface of the ball and intimately united with the metal of the ball to result in a lever handle substantially indestructible by shocks, and also providing a durable smooth, even and ornamental finish.

In testimony whereof I affix my signature.

KARL TURK.